US009582984B2

(12) United States Patent
Crepeau et al.

(10) Patent No.: US 9,582,984 B2
(45) Date of Patent: Feb. 28, 2017

(54) DETECTING PHYSICAL SEPARATION OF PORTABLE DEVICES

(71) Applicant: Motorola Mobility LLC, Chicago, IL (US)

(72) Inventors: Matthieu Robert Crepeau, Chicago, IL (US); Roland S Labana, Bloomingdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/693,993

(22) Filed: Apr. 23, 2015

(65) Prior Publication Data

US 2016/0314680 A1    Oct. 27, 2016

(51) Int. Cl.
| | | |
|---|---|---|
| G08B 21/00 | (2006.01) | |
| G08B 21/24 | (2006.01) | |
| G01S 5/02 | (2010.01) | |
| G08B 21/02 | (2006.01) | |
| H04W 4/02 | (2009.01) | |
| H04W 64/00 | (2009.01) | |

(52) U.S. Cl.
CPC ............ G08B 21/24 (2013.01); G01S 5/0284 (2013.01); G08B 21/02 (2013.01); G08B 21/0205 (2013.01); H04W 4/023 (2013.01); H04W 64/006 (2013.01)

(58) Field of Classification Search
None
See application file for complete search history.

(56) References Cited

U.S. PATENT DOCUMENTS

| | | | | |
|---|---|---|---|---|
| 8,773,275 | B1 * | 7/2014 | Parenteau | ............... G01S 19/16 340/539.13 |
| 2015/0319573 | A1 * | 11/2015 | Huang | .............. H04M 1/72572 455/456.1 |

FOREIGN PATENT DOCUMENTS

| | | |
|---|---|---|
| CN | 202650205 U | 1/2013 |
| WO | 2014121578 A1 | 8/2014 |
| WO | 2014121743 A1 | 8/2014 |

OTHER PUBLICATIONS

Jonathan Lester, et al., "Are You With Me?" Using Accelerometers to Determine if Two Devices are Carried by the Same Person, Pervasive Computing, Lecture Notes in Computer Science, vol. 3001, 2004, 18 pages, Seattle, WA, USA.

* cited by examiner

*Primary Examiner* — Adolf Dsouza
(74) *Attorney, Agent, or Firm* — Amerson Law Firm, PLLC

(57) ABSTRACT

A method for detecting physical separation between a first device and a second device includes identifying a moving state of the first device. A first set of motion data is collected for the first device responsive to identifying the moving state. A second set of motion data is received from a second device. The first and second sets of motion data are compared to determine a motion consistency metric. An alert signal is generated responsive to the motion consistency metric being less than a predetermined threshold.

18 Claims, 3 Drawing Sheets

DETECTING PHYSICAL SEPARATION OF PORTABLE DEVICES

BACKGROUND OF THE INVENTION

1. Field of the Invention

The disclosed subject matter relates generally to portable computing systems and, more particularly, to detecting physical separation of portable devices.

2. Description of the Related Art

Portable computing devices, such as mobile phones, tablet, wearable devices, etc., are susceptible to being inadvertently left behind by a user, becoming detached from the user, or falling out of a bag or pocket in which they are being carried. The loss of such devices is costly to the user due to the replacement cost of the item itself as well the potential disclosure of private information.

The present disclosure is directed to various methods and devices that may solve or at least reduce some of the problems identified above.

BRIEF DESCRIPTION OF THE DRAWINGS

The disclosure may be understood by reference to the following description taken in conjunction with the accompanying drawings, in which like reference numerals identify like elements, and in which.

Figure 1:
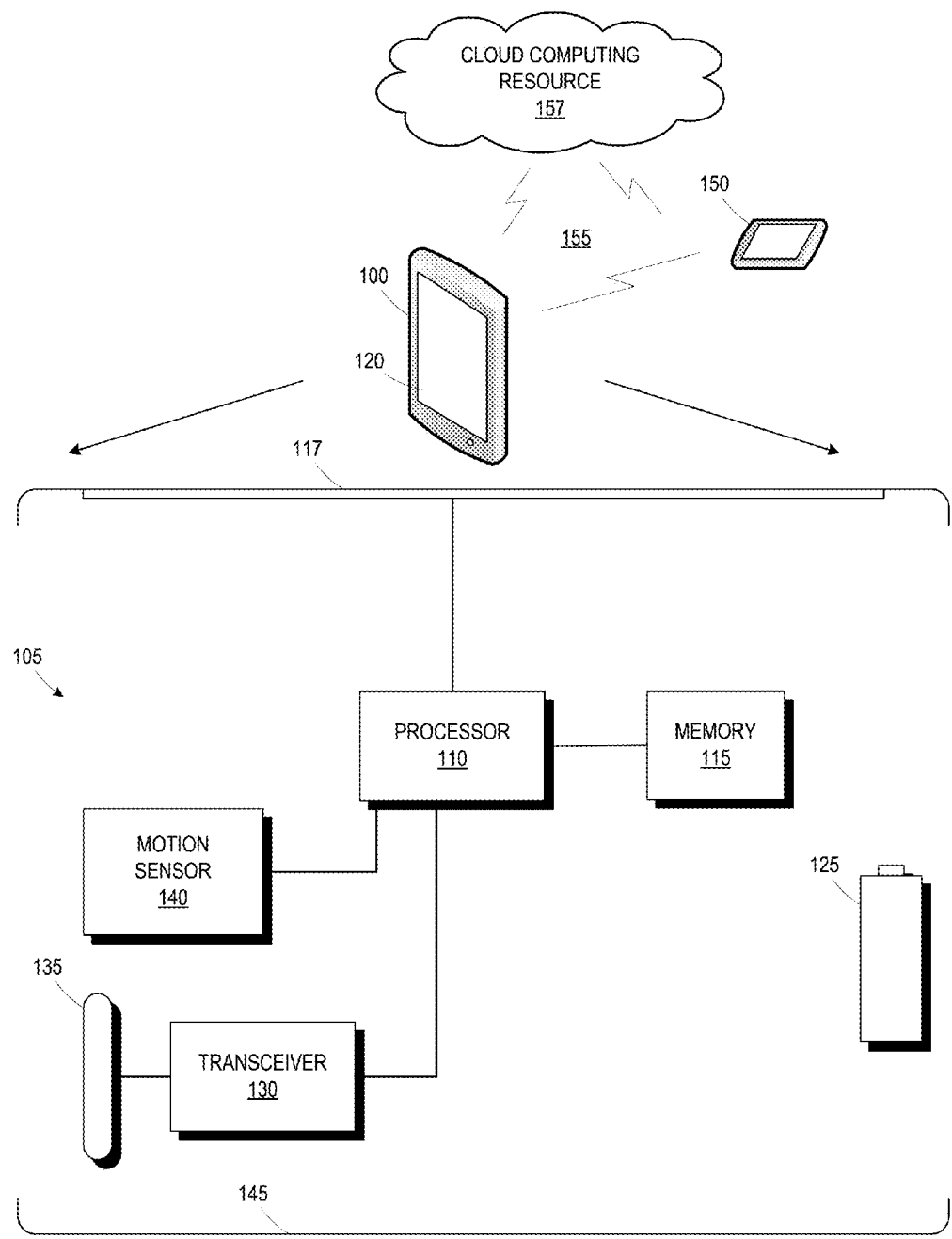
FIG. 1 is a simplified block diagram of communicatively coupled devices, where at least one of the devices includes a computing system configured to detect the physical separation of the devices, according to some embodiments disclosed herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
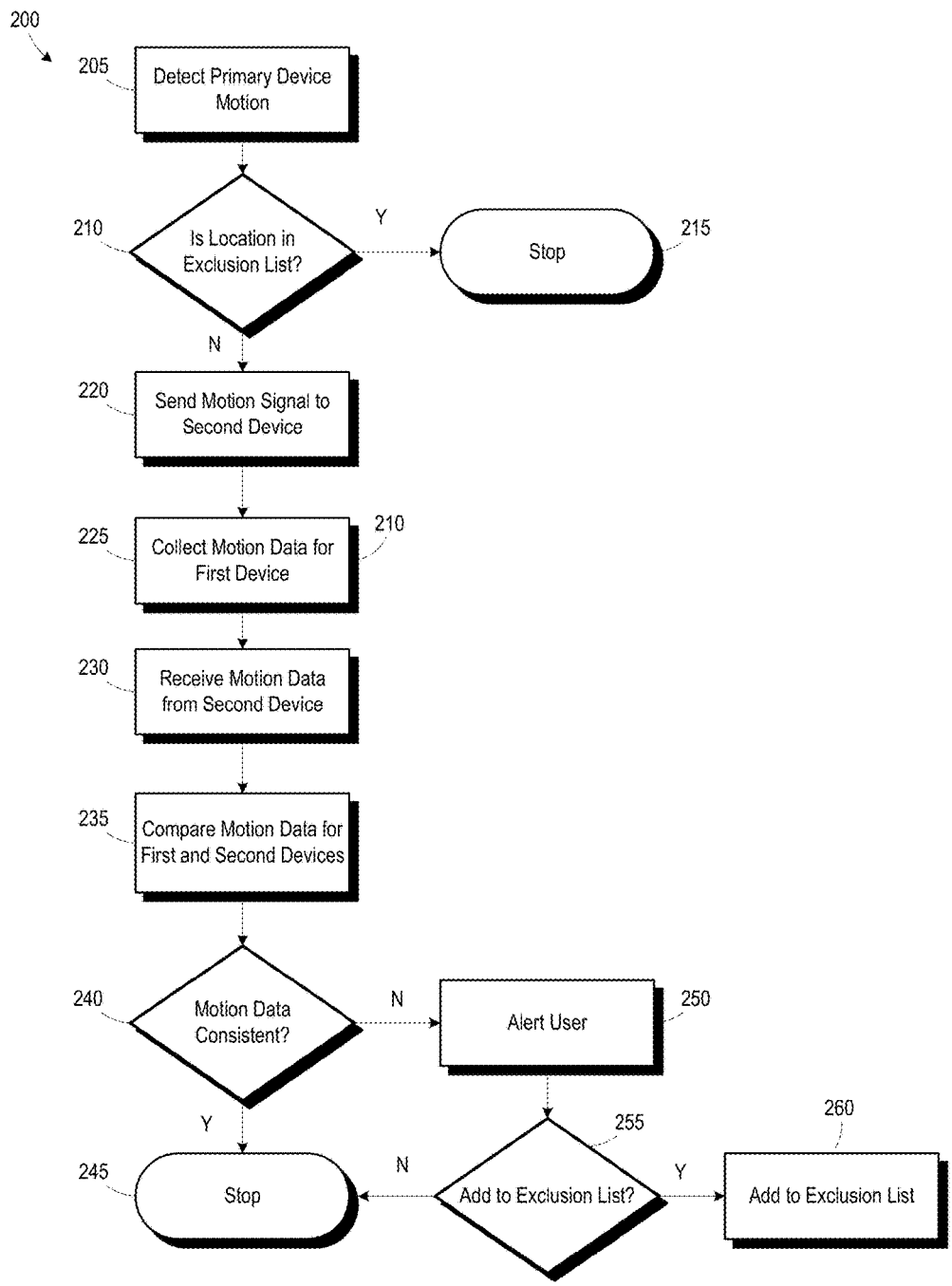
FIG. 2 is a flow diagram of a method for detecting physical separation of devices, according to some embodiments disclosed herein.
Figure 3:
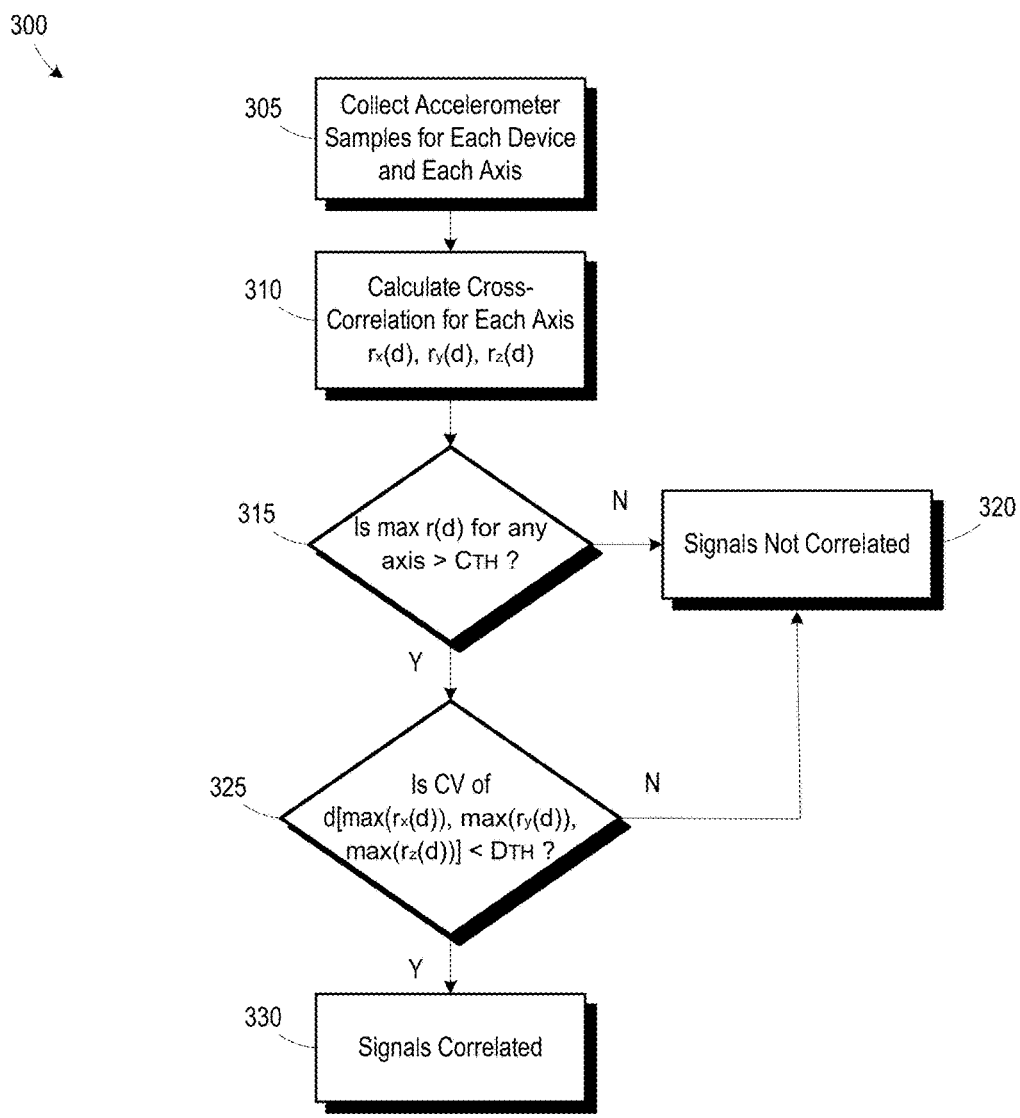
FIG. 3 is a flow diagram of an illustrative method for comparing motion data for the devices, in accordance with some embodiments disclosed herein.

FIGS. 1-3 illustrate various illustrative examples of techniques for detecting physical separation of portable devices in accordance with aspects of the present subject matter. Motion sensors on the devices may be used to generate the motion data for each device. For example, the motion data may include time series accelerometer data for each of three axes. The sets of motion data may be compared to one another to identify a situation where the motion of one device is not consistent with the motion of the other device. A difference in the motion data sets may indicate that the devices are no longer being carried by the user and that the user may have left one of the devices behind. Upon detecting a possible physical separation, one or both devices may emit an alert to the user, such as an audible alert, a vibration alert, an alert message, etc. The intensity of the alert may depend on the magnitude of the difference in motion between the two devices.

FIG. 1 is a simplistic block diagram of a first device 100 including a computing system 105. The computing system 105 includes a processor 110, a memory 115, a display 120, and a battery 125 to provide power for the computing system 105. The memory may be a volatile memory (e.g., DRAM, SRAM) or a non-volatile memory (e.g., ROM, flash memory, etc.). In some embodiments, the device 100 may be a communications device, such as a mobile phone, and the computing system may include a transceiver 130 for transmitting and receiving signals via an antenna 135. The transceiver 130 may include multiple radios for communicating according to different radio access technologies, such as cellular, Wi-Fi, or Bluetooth®. A motion sensor 140 (e.g., an accelerometer, magnetometer, mercury switch, gyroscope, compass, or some combination thereof) is provided to measure the motion of the device 100 relative to a physical reference point or surface (e.g., the surface of the Earth). The motion sensor 140 may be a physical sensor or a virtual sensor that receives data from a physical sensor and employs a processing resource, such as the processor 110 or another processor to process the physical data to determine the motion of the device 100. The device 100 includes an outer casing 145 that supports the display 120 and surrounds the active components of the computing system 105 and provides outer surfaces along which a user interfaces with the device 100.

In the first device 100, the processor 110 may execute instructions stored in the memory 115 and store information in the memory 115, such as the results of the executed instructions. The processor 110 controls the display 120 and may receive user input from the display 120 for embodiments where the display 120 is a touch screen. Some embodiments of the processor 110, the memory 115, and the motion sensor 140 may be configured to perform portions of the method 200 shown in FIG. 2. For example, the processor 110 may execute an application, that may be executed by the computing system 105, to detect a physical separation between the first device 100 and a second device 150 that communicates with the first device over a communication link 155 (e.g., a Wi-Fi or Bluetooth® connection). The second device 150 may also include a computing system having some or all of the entities in the computing system 105 of the first device 100.

In various embodiments, the device 100 may be embodied in handheld or wearable device, such as a laptop computer, a handheld computer, a tablet computer, a mobile device, a telephone, a personal data assistant ("PDA"), a music player, a game device, a wearable computing device, and the like. In some embodiments, the first device 100 may be a telephone device, and the second device 150 may be an accessory device, such as a smart watch, smart glasses, a tablet, etc. To the extent certain example aspects of the devices 100, 150 are not described herein, such example aspects may or may not be included in various embodiments without limiting the spirit and scope of the embodiments of the present application as would be understood by one of skill in the art.

FIG. 2 is a flow diagram of an illustrative method 200 for detecting a physical separation between the devices 100, 150, in accordance with some embodiments. The method 200 may be implemented on only one of the devices 100, 150, or it may be implemented concurrently on both devices 100, 150. In some embodiments, a cloud computing resource 157 (see FIG. 1) may also be used to perform one or more elements of the method 200 or to communicate data between the devices 100, 150.

For purposes of illustration, the method 200 is described as it may be implemented by the processor 110 of the first device 100. In method block 205, a moving state of the first device 100 is identified. In some embodiments, an operating system implemented by the processor 110 may set a flag or broadcast an event when data from the motion sensor 140 detects motion above a particular threshold, thereby transitioning from a rest state to a moving state. For example, accelerometer data may be integrated to determine a velocity vector for the first device 100. If the magnitude of the velocity vector exceeds a threshold, a motion flag or event may be triggered.

In method block 210, the location of the first device 100 is compared to a list of exclusion locations. A user of the first device 100 may set exclusion locations when configuring the device 100 or after receiving an alert, as described below. Exemplary exclusion locations may be at work, at home, etc. The exclusion list may also include temporal limitations. Exemplary exclusion list entries may include, at home between 7:00 p.m. and 8 a.m. and at the office between 9:00 a.m. and 6:00 p.m. In general, when the user is in one of the exclusion locations it is more likely that the first and second devices 100, 150 may not be moving in the same manner. For example, the user may leave the first device 100 in a docking station at home or in the office without removing the second device 150 from his or her person. The location may be determined based on actual position data (e.g., GPS) or based on network connectivity (e.g., work network or home network). If the location is in the exclusion list in method block 210, the method terminates in method block 215. By terminating the method 210, the alert signal identifying the physical separation of the devices 100, 150 may be suppressed for exclusion list locations.

If the location is not in the exclusion list in method block 210, a motion signal is sent to the second device 150 in method block 220 over the communication link 155. In method block 225, the first device 100 collects motion data about the first device 100. In some embodiments, the motion data may be raw data from the motion sensor 140, such as raw accelerometer data. In other embodiments, the motion data may be processed data, such as integrated accelerometer data. For example, the processor 110 may integrate the accelerometer data over time to generate velocity data or integrate the accelerometer data twice to generate position data. In the illustrated example, the motion data is time series accelerometer data for each of the x, y and z axes.

In response to receiving the motion signal, the second device 150 also collects motion data for the second device 150. This collection may be concurrent with the motion data collection by the first device 100. In method block 230, the first device 100 receives motion data from the second device 150 over the communication link 155.

In method block 235, the motion data from the first device 100 is compared to the motion data from the second device 150. As will be described in greater detail below in reference to FIG. 3, in some embodiments, a cross-correlation technique may be used to compare the motion data from the devices 100, 150 to generate a motion consistency metric. In method block 240, the processor 110 determines if the motion data from the devices 100, 150 is consistent. For example, a cross-correlation metric generally has a value between −1 (inversely correlated) and 1 (perfectly correlated), where a value of 0 indicates no correlation. If one of the devices 100, 150 is physically separated or left behind, it is unlikely to be experiencing the same motion characteristics, indicated by a motion correlation metric less than a predetermined threshold (e.g., less than 0.8 or 80%). If the motion data is consistent (e.g. correlation metric greater than or equal to 80%) in method block 240, the method terminates in method block 245. Other types of comparisons may also be used. Such comparisons may include time domain comparisons, frequency domain comparisons. or a combination thereof. In some embodiments, the comparison of the motion data may be performed by the cloud computing resource 157, where the first device 100 and the second device 150 both send their respective data to the cloud computing resource 157, and the cloud computing resource 157 returns the results of the comparison (e.g., motion consistency metric or alert signal) to the first device 100.

If the motion data is not consistent in method block 240, the user is alerted in method block 250. A user alert may be an audible alert, a vibration alert, an alert message, etc. The intensity of the alert may increase over time or depending on the magnitude of the motion difference. An alert notification signal may also be sent to the second device 150 so that both may alert the user, since it may be unclear which device 100, 150 is actually physically separated. In some embodiments, only the first device 100 implements the method 200. The second device 150 collects its motion data and communicates that data to the first device 100 or the cloud computing resource 157 responsive to the motion signal. The first device 100 or the cloud computing resource 157 performs the motion comparison and sends the alert signal to the second device 150. In other embodiments where both devices 100, 150 are implementing the method 200, then each device 100, 150 may independently analyze the motion data and issue alerts. Cross-communicating the motion data and the notification alert signals allows either device 100, 150 to detect a physical separation.

Alerting the user allows immediate corrective action to be taken to retrieve the misplaced device. For example, if the user leaves one device on a bus and starts to walk away, the walking motion triggers the motion detection in method block 205 and the subsequent motion analysis. The user alert may be registered prior to the user even leaving the bus, so that the device can be retrieved. The alert issued by the separated device may aid the user in locating the device. The alert notification may also include a pop-up window that allows the user to selectively lock the separated device to prevent others from using it.

In some instances, the user may have intended to physically separate the devices 100, 150. After issuing the alert in method block 250, a pop-up window may be presented on one or both of the devices 100, 150 to prompt the user whether to add the current location to the exclusion list in method block 255. In response to the user input, the location may be added to the exclusion list in method block 260. The exclusion list entry may be permanent or temporary in that the user may specify that the location is to be excluded for a specified time window.

FIG. 3 is a flow diagram of an illustrative method 300 for comparing motion data for the devices 100, 150, in accordance with some embodiments. In method block 305, the accelerometer data for each axis for each device 100, 150 is collected. In method block 310, a cross-correlation is computed for each axis, $rx(d)$, $ry(d)$, $rz(d)$ as a function of the sample lag, d. In method block 315 the maximum value of the cross-correlation function for each axis, max $r(d)$, is compared to a correlation threshold, $C_{TH}$. If any axis has a maximum correlation coefficient that is less than the correlation threshold, the motion signals are designated as not being correlated in method block 320.

If all of the axes exhibit correlation coefficients greater than the threshold in method block 315, their sample lag is compared using their coefficient of variation, CV, (std dev/mean) for the sample lag, CV of $d[max(rx(d)), max(ry(d)), max(rz(d))]$. If the sample lags are less than a predetermined sample lag threshold, $D_{TH}$, in method block 325, the motion signals are designated as being correlated in method block 330. If the lags are not close in method block 325, the motion signals are designated as not being correlated in method block 320. In some embodiments, the degree of correlation may be used to set the intensity of the alert provided to the user (e.g., the volume).

In some embodiments, certain aspects of the techniques described above may be implemented by one or more processors of a processing system executing software. The methods 200, 300 described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method for detecting physical separation between a first device and a second device includes identifying a moving state of the first device. A first set of motion data is collected for the first device responsive to identifying the moving state. A second set of motion data is received from a second device. The first and second sets of motion data are compared to determine a motion consistency metric. An alert signal is generated responsive to the motion consistency metric being less than a predetermined threshold.

A first device includes a motion sensor to generate motion data and a processor coupled to the orientation sensor. The processor is to identify a moving state of the first device, collect a first set of motion data for the first device responsive to identifying the moving state, receive a second set of motion data from a second device communicatively coupled to the first device, compare the first and second sets of motion data to determine a motion consistency metric, and generate an alert signal responsive to the motion consistency metric being less than a predetermined threshold.

A method includes identifying a moving state of a first device. A first set of motion data is collected for the first device responsive to identifying the motion state. The first set includes motion data for each of a plurality of axes. A motion signal is sent to a second device responsive to identifying the moving state of the first device. A second set of motion data is received from the second device. The second set includes motion data for each of the plurality of axes. The first and second sets of motion data are compared to determine a motion consistency metric for each of the axes. An alert signal is generated responsive to the motion consistency metric for any of the axes being less than a predetermined threshold.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A method for detecting physical separation between a first device and a second device, comprising:
   identifying a moving state of the first device;
   collecting a first set of motion data for the first device responsive to identifying the moving state;
   sending a motion signal to the second device responsive to identifying the moving state of the first device
   receiving a second set of motion data from a second device responsive to identifying the moving state and responsive to the moving signal;
   comparing the first and second sets of motion data to determine a motion consistency metric; and
   generating an alert signal responsive to the motion consistency metric being less than a predetermined threshold.

2. The method of claim 1, wherein comparing the first and second sets of motion data comprises computing a cross-correlation between the first and second sets of motion data to generate the motion consistency metric.

3. The method of claim 2, wherein each of the first and second sets of motion data includes motion data for a plurality of axes, computing the cross-correlation between the first and second sets of motion data comprises generating a motion consistency metric for each of the plurality of axes, and generating the alert signal comprises generating the alert signal responsive to the motion consistency metric for any of the axes being less than the predetermined threshold.

4. The method of claim 3, further comprising:
   determining a sample lag between the motion consistency metrics for each of the axes; and
   generating the alert signal responsive to the sample lag being greater than a sample lag threshold.

5. The method of claim 1, wherein the first and second sets of motion data each comprise accelerometer data.

6. The method of claim 1, further comprising sending a notification alert signal to the second device responsive to the motion consistency metric being less than a predetermined threshold.

7. The method of claim 1, further comprising suppressing the generating of the alert signal responsive to a location of the first device being included in a list of exclusion locations.

8. The method of claim 1, wherein generating the alert signal comprises generating the alert signal having an intensity dependent on the value of the motion consistency metric.

9. A device, comprising:
   a motion sensor to generate motion data; and
   a processor coupled to the motion senor, wherein the processor is to identify a moving state of the device, collect a first set of motion data for the first device responsive to identifying the moving state, send a motion signal to the remote device responsive to identifying the moving state, receive a second set of motion data from a second device communicatively coupled to the first device responsive to identifying the moving state and responsive to the motion signal, compare the first and second sets of motion data to determine a motion consistency metric, and generate an alert signal responsive to the motion consistency metric being less than a predetermined threshold.

10. The device of claim 9, wherein the processor is to compute a cross-correlation between the first and second sets of motion data to generate the motion consistency metric.

11. The device of claim 10, wherein each of the first and second sets of motion data includes motion data for a plurality of axes, and the processor is to generate a motion consistency metric for each of the plurality of axes and generate the alert signal responsive to the motion consistency metric for any of the axes being less than the predetermined threshold.

12. The device of claim 11, wherein the processor is to determine a sample lag between the motion consistency metrics for each of the axes and generate the alert signal responsive to the sample lag being greater than a sample lag threshold.

13. The device of claim 9, wherein the first and second sets of motion data each comprise accelerometer data.

14. The device of claim 9, wherein the processor is to send a notification alert signal to the remote device responsive to the motion consistency metric being less than a predetermined threshold.

15. The device of claim 9, wherein the processor is to suppress the generation of the alert signal responsive to a location of the device being included in a list of exclusion locations.

16. The device of claim 9, wherein the alert signal has an intensity dependent on the value of the motion consistency metric.

17. A method comprising:
   identifying a moving state of a first device;
   collecting a first set of motion data for the first device responsive to identifying the motion state, the first set including motion data for each of a plurality of axes;
   sending a motion signal to a second device responsive to identifying the moving state of the first device;
   receiving a second set of motion data from the second device, the second set including motion data for each of the plurality of axes;
   comparing the first and second sets of motion data to determine a motion consistency metric for each of the axes; and
   generating an alert signal responsive to the motion consistency metric for any of the axes being less than a predetermined threshold.

18. The method of claim 17, further comprising:
   determining a sample lag between the motion consistency metrics for each of the axes; and
   generating the alert signal responsive to the sample lag being greater than a sample lag threshold.

* * * * *